(12) United States Patent
Hirschauer

(10) Patent No.: US 11,813,801 B2
(45) Date of Patent: Nov. 14, 2023

(54) METHOD FOR PRODUCING UNITS WITH AXIALLY MOVABLE COMPONENTS

(71) Applicants: thyssenkrupp Presta AG, Eschen (LI); thyssenkrupp AG, Essen (DE)

(72) Inventor: Peter Hirschauer, Feldkirch (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 891 days.

(21) Appl. No.: 16/650,122

(22) PCT Filed: Sep. 27, 2018

(86) PCT No.: PCT/EP2018/076237
§ 371 (c)(1),
(2) Date: Mar. 24, 2020

(87) PCT Pub. No.: WO2019/068545
PCT Pub. Date: Apr. 11, 2019

(65) Prior Publication Data
US 2020/0276766 A1 Sep. 3, 2020

(30) Foreign Application Priority Data
Oct. 5, 2017 (DE) .................... 10 2017 123 161.7

(51) Int. Cl.
*B29C 65/08* (2006.01)
*B29C 65/56* (2006.01)
(Continued)

(52) U.S. Cl.
CPC .......... *B29C 65/088* (2013.01); *B29C 65/565* (2013.01); *B29C 66/5221* (2013.01);
(Continued)

(58) Field of Classification Search
CPC . B29C 65/088; B29C 65/565; B29C 66/5221; B29C 66/5241
(Continued)

(56) References Cited

U.S. PATENT DOCUMENTS 4,033,020 A 7/1977 Hudgens
8,858,742 B2 * 10/2014 Spicer .................... B23K 20/10
156/359

(Continued)

FOREIGN PATENT DOCUMENTS

CN 203996397 U 12/2014
DE 26 35 120 A 2/1977
(Continued)

OTHER PUBLICATIONS

English Translation of International Search Report issued in PCT/EP2018/076237, dated Sep. 27, 2018.

*Primary Examiner* — James D Sells
(74) *Attorney, Agent, or Firm* — thyssenkrupp North America, LLC

(57) ABSTRACT

A method may produce an axially movable connection between two components with a plastic as a sliding material arranged therebetween. The method may involve providing the two components and either at least one of the two components has a plastic coating or a plastic sleeve is provided between the components, joining the two components to form a unit via a pressing force in an axial direction, clamping the unit in a device in which the two components are clampable and subjectable to a displacement force in the axial direction, pressing a sonotrode against an outer of the two components and bracing the outer component against a counter-holder, injecting an ultrasound signal into the sonotrode and moving the two components back and forth in the axial direction until a displacement force or a displacement
(Continued)

velocity reaches a target, and ending the ultrasound signal and removing the unit from the device.

9 Claims, 5 Drawing Sheets

(51) Int. Cl.
    *B29C 65/00*       (2006.01)
    *B62D 1/185*     (2006.01)
    *B62D 1/20*       (2006.01)
    *F16C 3/035*     (2006.01)
    *F16D 3/06*      (2006.01)

(52) U.S. Cl.
    CPC .... *B29C 66/5241* (2013.01); *B29C 66/93411* (2013.01); *B29C 66/961* (2013.01); *B62D 1/185* (2013.01); *B62D 1/20* (2013.01); *F16C 3/035* (2013.01); *F16D 3/06* (2013.01); *F16C 2326/24* (2013.01); *F16D 2300/12* (2013.01)

(58) Field of Classification Search
    USPC ..................................................... 156/73.1
    See application file for complete search history.

(56) References Cited

U.S. PATENT DOCUMENTS

| | | |
|---|---|---|
| 9,452,444 B2 | 9/2016 | Miyawaki |
| 2005/0087970 A1 | 4/2005 | Ulintz |
| 2010/0307280 A1 | 12/2010 | Schnitzer |
| 2011/0034256 A1 | 2/2011 | Tokioka |
| 2011/0219907 A1 | 9/2011 | Rietzler |
| 2014/0020502 A1 | 1/2014 | Schnitzer |
| 2014/0041194 A1 | 2/2014 | Kurokawa |
| 2018/0251147 A1* | 9/2018 | Heitz ............. B62D 1/181 |
| 2019/0092370 A1 | 3/2019 | Breuer |
| 2019/0176871 A1 | 6/2019 | Breuer |

FOREIGN PATENT DOCUMENTS

| | | |
|---|---|---|
| DE | 100 63 183 A | 6/2002 |
| DE | 10 2004 051 670 A | 5/2005 |
| DE | 10 2008 005 256 | 8/2009 |
| DE | 10 2008 049 825 A | 4/2010 |
| DE | 102015216326 A | 6/2016 |
| DE | 10 2016 203 627 B | 3/2017 |
| DE | 10 2016 114 970 A | 2/2018 |
| EP | 2 281 731 B | 2/2011 |
| WO | 2009090018 A | 7/2009 |
| WO | 2017032566 A | 3/2017 |

* cited by examiner

METHOD FOR PRODUCING UNITS WITH AXIALLY MOVABLE COMPONENTS

CROSS REFERENCE TO RELATED APPLICATIONS

This application is a U.S. National Stage Entry of International Patent Application Serial Number PCT/EP2018/076237, filed Sep. 27, 2018, which claims priority to German Patent Application No. DE 10 2017 123 161.7, filed Oct. 5, 2017, the entire contents of both of which are incorporated herein by reference.

FIELD

The present disclosure generally relates to steering systems, including motor vehicle steering systems.

BACKGROUND

Sliding connections for mutually movable components, such as coaxial tubes or shafts which are telescopic with respect to on another, which are inserted telescopically and rotationally firmly in one another, are used in various areas of technology. The sliding connection should generally be low-friction, free of play, and mechanically tough. Such telescopic connections are used in various places especially in motor vehicle steering systems. On the one hand, there is a telescopic combination of an inner and an outer casing tube in the steering column itself, which surround a steering shaft and are telescopic to allow the axial displacement of the steering column. Moreover, the steering shaft itself, which transmits the steering torque of the driver to the steering gearing, is generally telescopic. A roughly cloverleaf shaped cross section is used here, which is suitable for the transmitting of the torque, so that the inner shaft piece and the outer shaft piece engage with each other by form fit in the rotary direction. In both instances, a plastic sleeve is often installed between the two mutually sliding components made of metal. The problem and the expense in the fabrication of these connections is that the plastic piece cannot be installed directly as a component and can meet the requirements of freedom from play and a defined friction during the axial displacement movement without further processing steps.

In DE 26 35 120 A1 a method is proposed for producing a sliding connection of a shaft, in which an outer shaft and an inner shaft are preassembled with a sleeve in between. The outer shaft is then deformed inwardly, and the components are calibrated to each other with a displacement operation. A heating is also done. The heating may be done with an induction heating, a gas flame, or a contact heating, so that the plastic is placed in a plastic flow movement. The drawback here is the necessary time expense and the required thermal energy for the heating of the components. The end result also is not satisfactory in all cases, since the shaft pieces are heated and the geometry in the joint region changes due to the cooling down of the s once more after the above described process.

In U.S. Pat. No. 9,452,444 B2 a method is proposed for the production of a telescopic shaft, in which the two shaft pieces, one of which is coated with a plastic, are at first put together and then a displacement movement is initiated. The displacement force in this process is measured. The displacement is then continued for as long as it takes to reach a desired displacement force.

EP 2281731 B1 discloses a similar method. The drawbacks here are the relatively large forces which must be exerted to calibrate the plastic layer. The long process time of the oscillating displacement movement and the costly equipment requirements are also a drawback.

Thus a need exists for a method with which the process time can be shortened, less energy expense is required, and a better result can be achieved. A need also exists for a device with mutually sliding components in which a better freedom from play and a more precise maintaining of given frictional forces or sliding forces are present.

DETAILED DESCRIPTION

Figure 1:
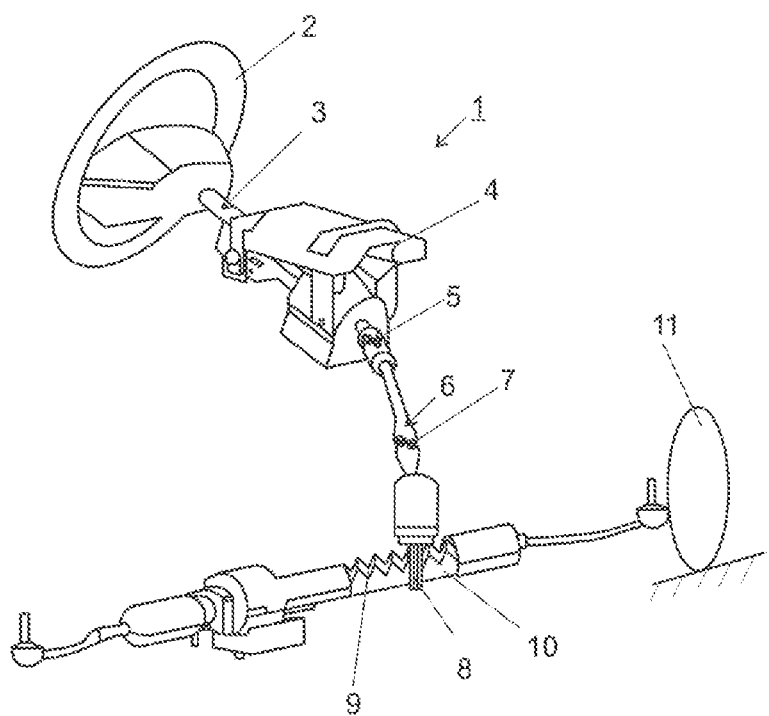
FIG. 1 is a schematic view of an example motor vehicle steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a method for producing an axially movable connection between two components, between which a plastic is arranged as a sliding material, comprises:

a) providing the two components to be joined, wherein either at least one of the two components has a plastic coating on the surface facing toward the other component or a plastic sleeve is provided between the components, b) joining the components to form a unit, optionally with the plastic sleeve, by means of a pressing force in the axial direction, c) clamping the unit in a device in which the two shaft pieces can be clamped and subjected to a displacement force in the axial direction, d) pressing a sonotrode from one side against the respectively outer component and bracing the component against a counter-holder, e) injecting an ultrasound signal into the sonotrode and moving the shaft pieces back and forth in the axial direction until the displacement force or the displacement velocity reaches a desired target value, f) ending the ultrasound signal and removing the unit from the device.

This makes possible a faster and ultimately a more precise calibrating of the plastic sleeve or the sliding sleeve or the plastic coating in the displacement region of the components.

The problem of such an axially movable connection between two components, especially two cylindrical components, is to produce a displacement capability with the least possible displacement force and at the same time slight play between the components. In the case when the cylindrical components being shafts are supposed to transmit a torque, furthermore the largest possible torque should be transmitted securely. Especially in this case, when torques are to be transmitted, the cross section areas of the cylindrical components have a configuration deviating from a circular shape. Corresponding slots or teeth or grooves, for example, may then be provided. In the designing of such a connection, a maximum permissible force needed to produce a displacement of the two components relative to each other is required. This force then constitutes the target value for the desired displacement force. It may also be provided to establish the target value for the desired displacement force at a value corresponding to 5%, preferably 10%, below the maximum permissible value for the displacement force that is established in the design.

The desired target value for the displacement velocity is determined by ascertaining in experiments the speed at which the desired target value for the displacement force is reached for a given displacement force lying above the maximum permissible displacement force. The target value for the speed is then established accordingly. Advantageously, an end stop can be provided at the target value of 5%, and more preferably at 10%.

Preferably in the method an ultrasound signal is injected into the sonotrode with a frequency in the range of 20 kHz to 35 kHz. More preferably, a frequency range of 25 kHz to 30 kHz is used.

It may be advantageous to vary the frequency of the ultrasound signal injected into the sonotrode during the course of the process of the method.

Preferably, the components are an inner shaft piece and an outer shaft piece, especially an inner steering shaft and an outer steering shaft of a motor vehicle steering system. It may also be provided that the components are an inner casing tube and an outer casing tube of an axially telescopic motor vehicle steering system.

If two sonotrodes are pressed against the outer component in step d), a more intensive or otherwise parametrized energy injection is possible. In particular, the two sonotrodes can be injected with ultrasound signals of different frequencies.

Furthermore, it has been found that more than two sonotrodes may also be used with advantage in order to further increase the energy injection. A different frequency or a different frequency variation over the process time may be employed at each sonotrode.

The ultrasound power may also be set separately for each sonotrode. Variations may also be provided. Thus, for a short starting time of up to 3 s, a high power can be provided, and then a low power for the rest of the process time. The low power is advantageously ⅓ lower than the high power.

To implement the method of producing the axially movable connection, the mutual displacement of the two components can be accomplished preferably with a pneumatic cylinder, optionally with a hydraulic cylinder. A force-guided movement of the clamped unit can be accomplished by the injected pressure. The force can also be adjusted for different speeds of movement and the displacement velocity can be measured.

In a motor vehicle steering systems having a telescopic steering shaft and/or a telescopic casing tube unit which is produced according to one of the methods described above, shorter possible cycle times and less energy expenditure are achieved in the fabrication process. Furthermore, the motor vehicle steering system has better qualities in regard to robustness, freedom from play, and freedom from noise.

FIG. 1 shows in a schematic representation a motor vehicle steering system 1 having a steering wheel 2, which is rotationally fixed to an upper steering shaft 3. The upper steering shaft 3 is mounted in a bracket 4 in height adjustable and axially movable manner. By a Cardan joint 5, the upper steering shaft can swivel, but it is rotationally fixed to a lower steering shaft 6. The lower steering shaft 6, finally, is connected by a second Cardan joint 7 to a pinion 8, which engages with a rack segment 9 of a rack 10.

A rotary movement of the steering wheel 2 thus results in a displacement of the rack 10 and in known manner to a swiveling of the steered wheels 11 of the motor vehicle, thereby producing a steering movement and a changing of the direction of travel.

Figure 2:
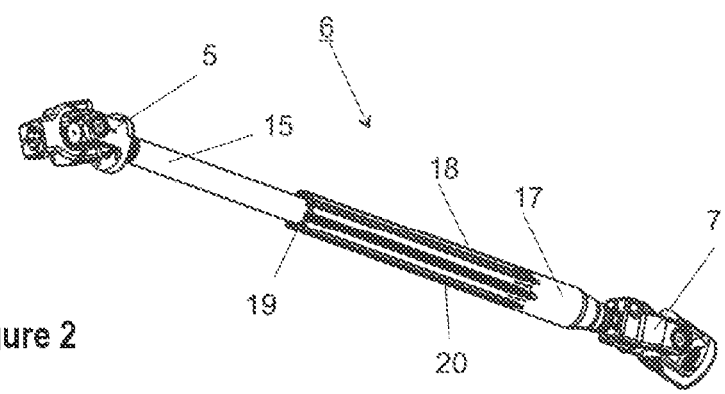
FIG. 2 is a perspective view of an example lower steering shaft.

The lower steering shaft 6 is shown in further detail in FIG. 2. The same or functionally equal components have the same reference numbers in the following figures.

The lower steering shaft 6 is provided with the first Cardan joint 5 and the second Cardan joint 7. The upper, first Cardan joint 5 is rotationally fixed to an inner shaft piece 15, while the second Cardan joint 7 is rotationally fixed to an outer shaft piece 17. The outer shaft piece 17 has a rotationally symmetrical circumferential structure 18, which extends as far as a free end 19 of the outer shaft piece 17. The structure 18 consists of straight slots 20, embossed in the shaft piece 17 from the outside. The slots 20 run axially parallel and give the shaft piece 17 somewhat of a star-shaped structure in cross section.

Figure 3:
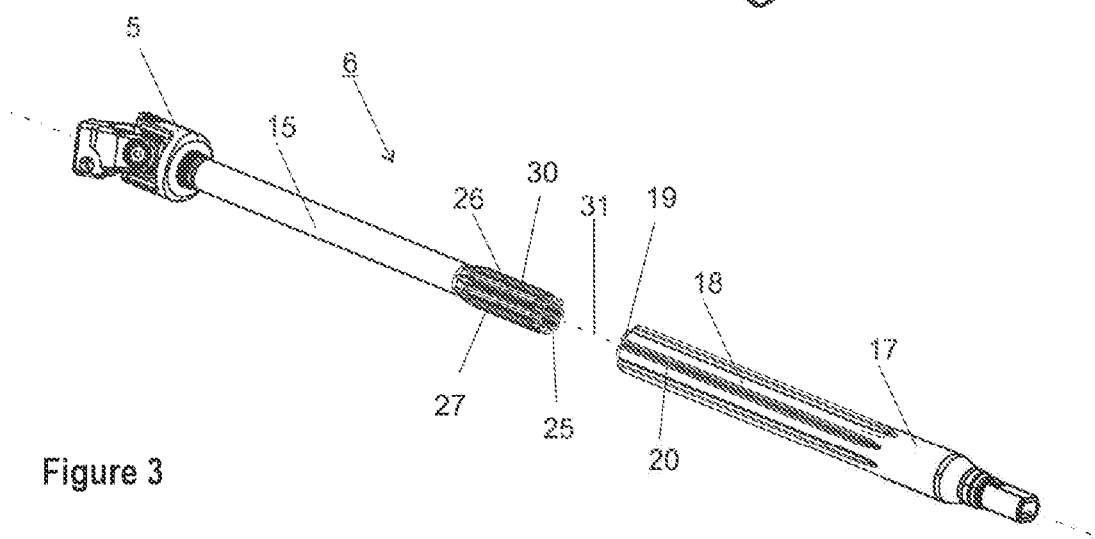
FIG. 3 is an exploded view of a lower steering shaft.

FIG. 3 shows the lower steering shaft 6 of FIGS. 1 and 2 in a perspective view, in which the inner shaft piece 15 and the outer shaft piece 17 are pulled apart. It can be seen here that the inner shaft piece 15 has a region 26 at its free end 25 having a shape deviating from a round circular cross section. The cross section of this region 26 is likewise characterized by slots or grooves, producing a star-shaped cross sectional shape, fitted to the free inner cross section of the outer shaft piece 17. This shall be described more closely below. In the representation of FIG. 3, the inner shaft piece 15 carries a plastic sleeve 30 in the region 26, which is adapted in its cross sectional shape to the region 26.

Figure 4:
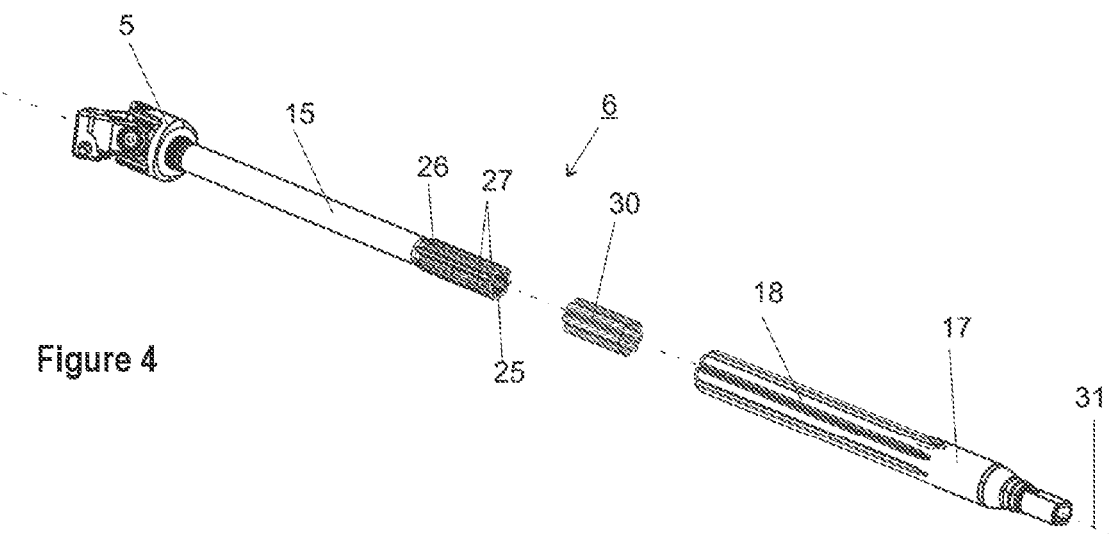
FIG. 4 is another exploded view of a lower steering shaft.

This becomes more clear in FIG. 4. FIG. 4 shows the lower steering shaft 6 in a representation corresponding to FIG. 3, but the plastic sleeve 30 has been removed from the region 26 of the inner shaft piece 15. The longitudinal axis and the axis of symmetry 31 also constitutes the axial direction here, in which the lower steering shaft 6 is telescopically formed.

The profiling of the lower steering shaft 6 in the regions in which the inner shaft piece 15 and the outer shaft piece 17 overlap and in which the plastic sleeve 30 is arranged between these two shaft pieces produces, when suitably designed, a connection which is fixed in rotation, yet telescopic in the direction of the longitudinal axis 31. In the case of the lower steering shaft 6, such a telescopic connection is advantageous, since the steering gearing is installed with the rack 10 in the region of the front axle of the motor vehicle, while the steering column 1 is secured roughly in the region of the dashboard support on the chassis. Relative movements of these fastening points are unavoidable during driving operation of the motor vehicle. These relative movements are absorbed by the design shown for the lower steering shaft 6. It is important for function and driving comfort that the connection between the two shaft pieces functions permanently free of play, yet low in friction. For this, a precise adapting of the plastic sleeve 30 to the two profilings on its inner side and outer side is required. The method according to the invention, making possible this adapting in especially advantageous manner, shall be described more closely in the following.

Figure 5:
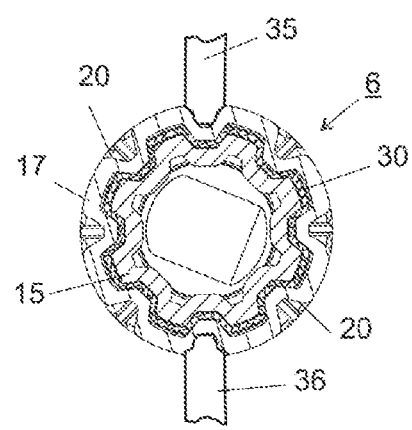
FIG. 5 is a cross-sectional view of the steering shaft of FIGS. 2-4 in an installation situation.

FIG. 5 shows the lower steering shaft 6 in a cross section in the profiled region, schematized in an installation situation. The inner shaft piece 15 and the outer shaft piece 17 are pushed together in their mutually fitted and profiled region. Between the inner surface of the outer shaft piece 17 and the outer surface of the inner shaft piece 15 the plastic sleeve 30 is situated, which sits there free of play. In order to guarantee freedom from play, the plastic sleeve 30 is provided oversized, so that the seating of the two shaft pieces in each other has a large friction in the beginning. During operation, this high friction would become perceptible and annoying due to unwanted forces and also due to noise production on account of the stick slip effect. For the adapting or calibrating of the plastic sleeve 30 to the exact dimensions of the two shaft pieces, it is provided during the manufacturing process to place a sonotrode 35 in a radial direction against the outer shaft piece 17. An anvil 36 is placed on the opposite side of the outer shaft piece 17. In this way, the outer shaft piece 17 is firmly clamped between the sonotrode 35 and the anvil 36.

Figure 6:
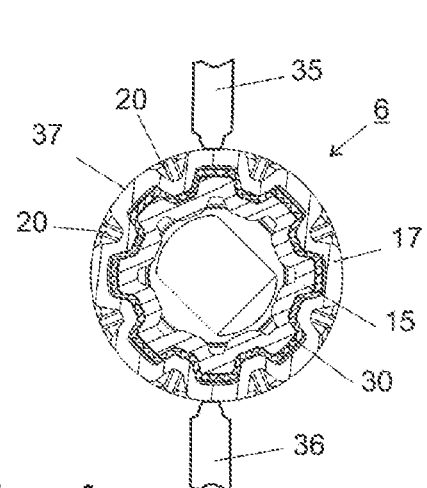
FIG. 6 is a cross-sectional view of the steering shaft of FIGS. 2-4 where a sonotrode and an anvil are mounted on outer faces formed between slots.

FIG. 6 shows a similar arrangement to FIG. 5. In FIG. 6, unlike FIG. 5, the sonotrode 35 and the anvil 36 have not been installed in the slots 20 of the outer shaft piece 17, but instead are mounted on outer faces 37 formed between the slots 20.

Figure 7:
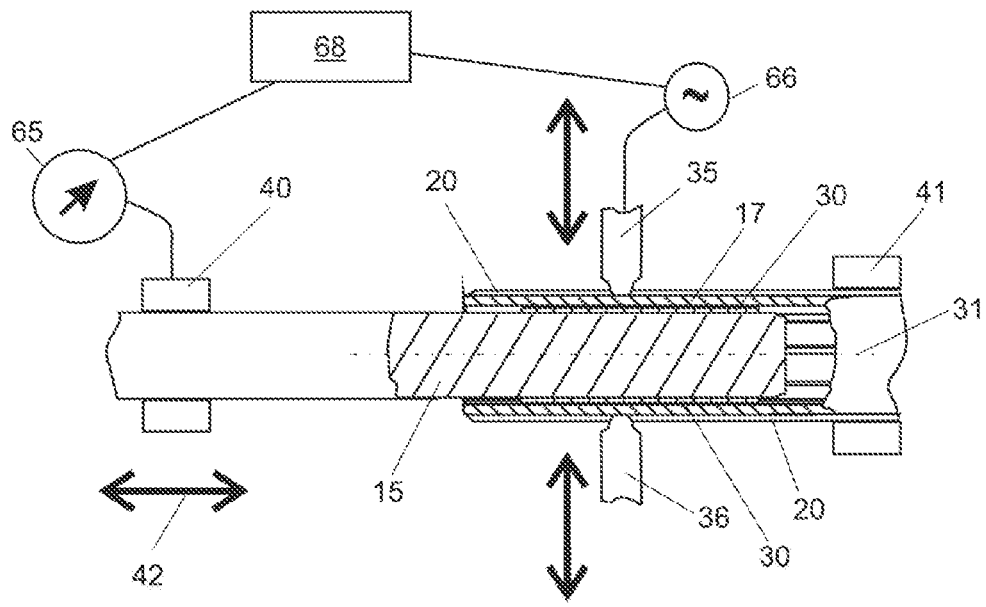
FIG. 7 is a longitudinal sectional view of a steering shaft of FIGS. 5-6 during the calibrating of the plastic sleeve.

FIG. 7 now shows the embodiment of FIG. 5 in a longitudinal section, once again the sonotrode 35 and the anvil 36 being placed respectively in a slot 20 of the outer shaft piece 17. The inner shaft piece 15 is inserted in the plastic sleeve 30 and the outer shaft piece 17. The two shaft pieces are now grasped by clamping jaws 40 and 41. A control and evaluation unit 68 undertakes the process control. The sonotrode 35 is actuated by a control unit 66 in order to transmit an ultrasound vibration to the outer shaft piece 17. In this way, the outer shaft piece 17 is placed in a mechanical vibration. Since the outer shaft piece 17 itself vibrates relatively freely, the vibrational energy is transmitted in large measure to the plastic sleeve 30, which is thereby deformed with high frequency. The plastic sleeve 30 becomes heated in this process. At the same time, the inner shaft piece 15 is moved back and forth in the axial direction by a relative movement in the direction of the double arrow 42 by means of the clamping jaws 40 and 41. The heated plastic sleeve 30 is thereby adapted to the two mutually facing surfaces of the inner shaft piece 15 and the outer shaft piece 17. The adapting process can be monitored by detecting the displacement force applied by the clamping jaws 40 and 41 during the reciprocating movement. For this purpose, a force sensor 65 can be provided. Preferably, the heating of the plastic sleeve 30 by means of ultrasound and the movement in the direction of the double arrow 42 is continued until such time as a given maximum displacement force is passed. The adapting process is then finished. After switching off the excitation of the sonotrode 35, the plastic sleeve 30 cools down quickly, since the two shaft pieces 15 and 17 themselves were essentially not heated by the ultrasound excitation and hence they are cold compared to the plastic sleeve 30. This promotes the dimensional stability of the plastic sleeve 30 thus calibrated. What is more, the outer shaft piece 17 and the inner shaft piece 15 undergo practically no thermal changes in their dimensions during this process. By contrast, in conventional methods the outer shaft piece was heated and after the calibrating process it cools down once more, so that the achievable precision of the calibrating process of the plastic sleeve 30 is limited.

The heating and cooling times of the described process are short, on account of the slight mass of the plastic sleeve 30 to be heated, so that a short cycle time can be achieved. Furthermore, it is enough to heat the plastic sleeve only at the surface, so that it can be easily molded.

Figure 8:
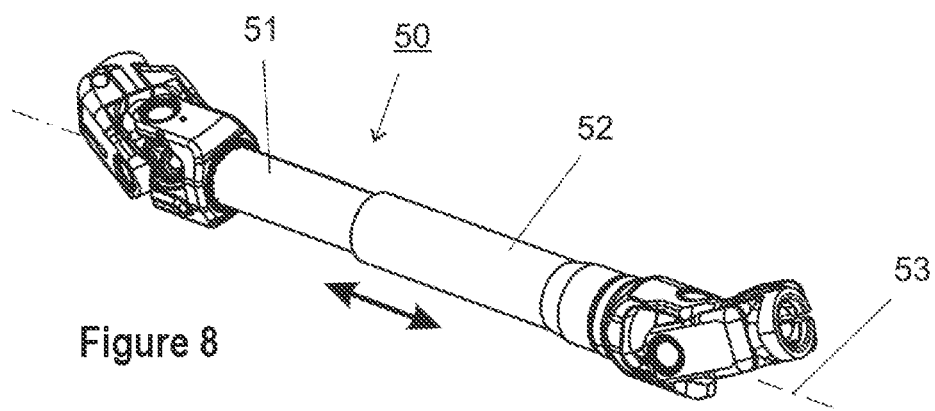
FIG. 8 is a perspective view of another example steering shaft.
Figure 9:
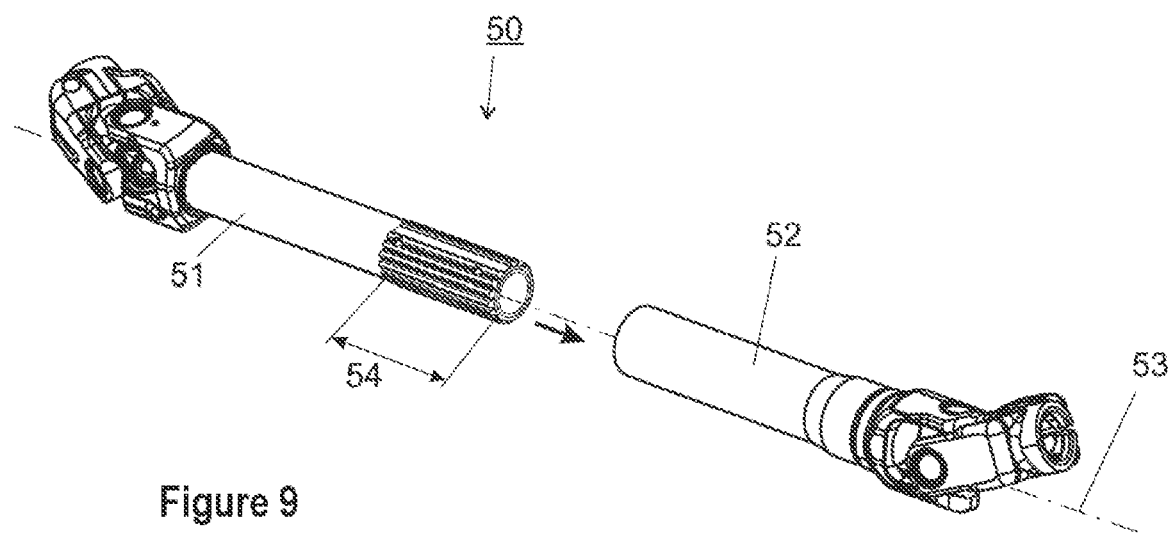
FIG. 9 is an exploded view of the example steering shaft of FIG. 8.

The above described method can be used not only for profiled shafts, such as the lower steering shaft 6, in which both the inner shaft piece 15 and the outer shaft piece 17 are profiled. Thus, FIGS. 8 and 9 show another embodiment of a telescopic steering shaft 50 with an inner shaft piece 51 and an outer shaft piece 52, which are fitted together telescopically in the direction of a longitudinal axis 53. The inner shaft piece 51 has an end face region 54 which is surface-coated. For the calibrating of this surface coating in the aforementioned sense, the method described in connection with FIGS. 5 to 7 can be applied to such a shaft.

Figure 10:
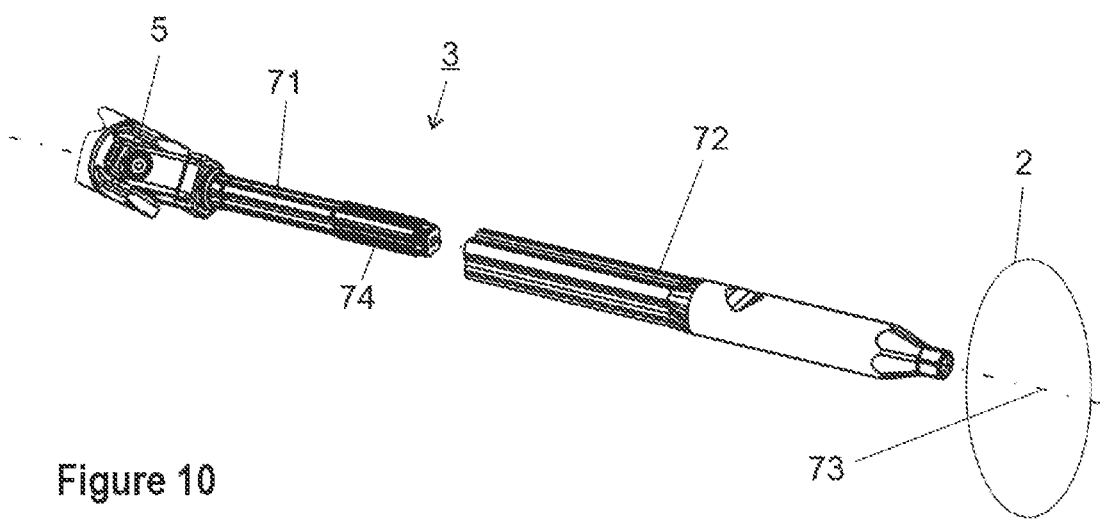
FIG. 10 is an exploded view of an example steering shaft, where an upper steering shaft has a telescopic connection.
Figure 11:
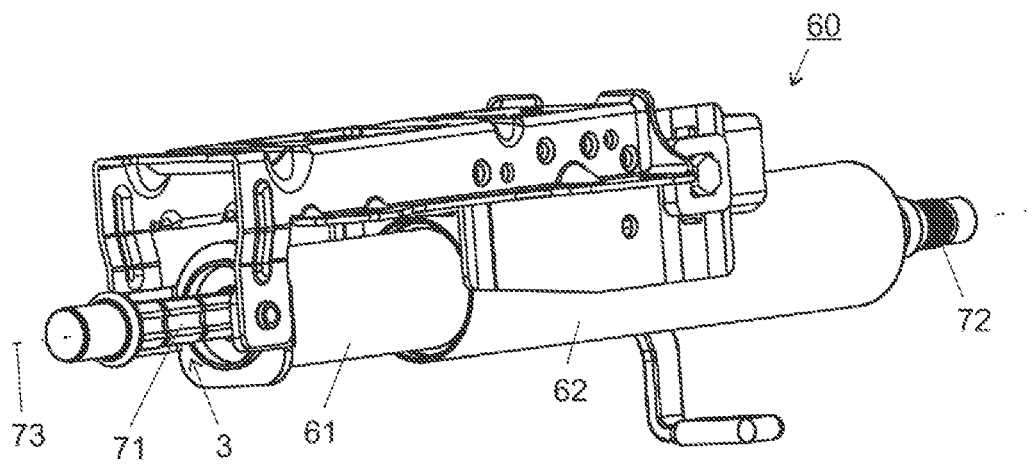
FIG. 11 is a perspective view of an example casing tube unit.
Figure 12:
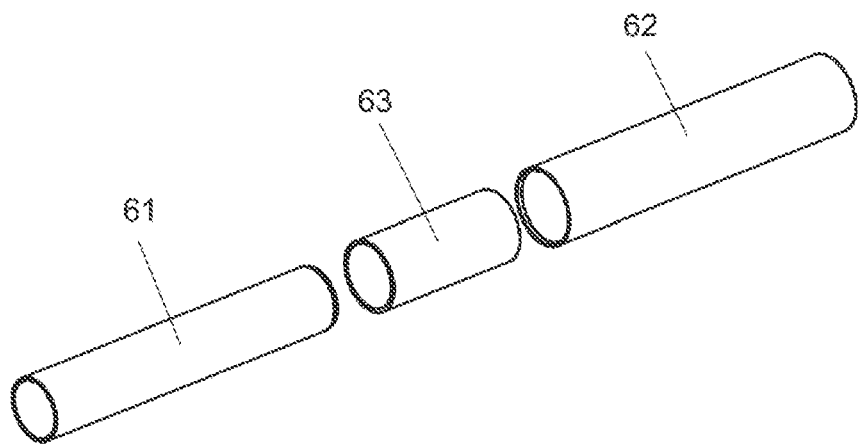
FIG. 12 is an exploded view depicting an example sliding sleeve between an inner casing tube and an outer casing tube.

However, it should be further noted that such a telescopic connection in length can also be advisable in the case of the upper steering shaft 3, as is shown in FIG. 10. In the case when the steering wheel 2 is displaceable to the bracket 4, such telescopic connections are also used for the upper steering shaft. All of the variants and embodiments represented with the aid of the lower steering shaft 6 are equally applicable to the upper steering shaft 3 as well. Accordingly, the upper steering shaft 3 may comprise an inner steering shaft 71 and an outer steering shaft 72 with a sleeve 74 between them, these being telescopically fitted together in the direction of a longitudinal axis 73. For the calibrating of this connection, the method described with the aid of FIGS. 5 to 7 can also be used for the upper steering shaft 3.

Figure 13:
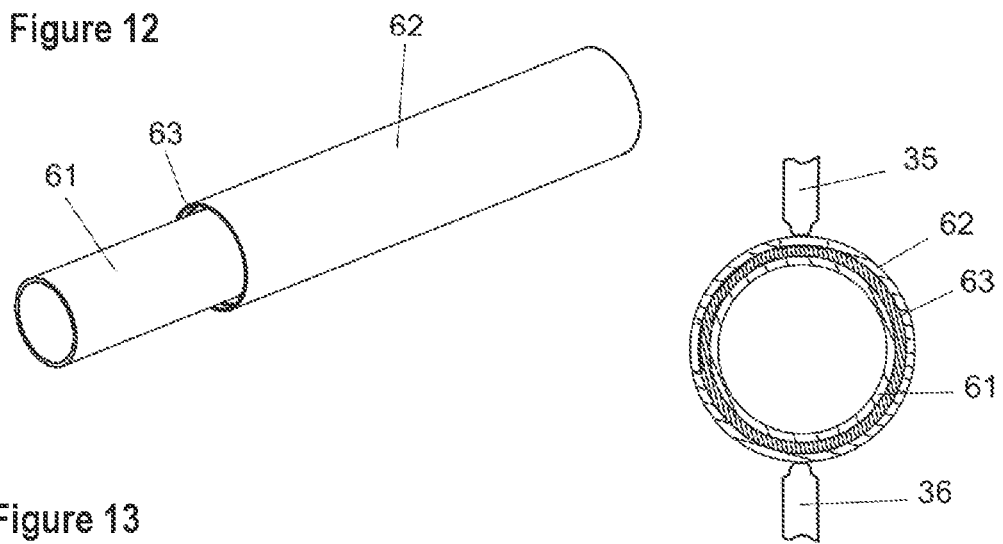
FIG. 13 is a perspective view of the inner and outer casing tubes and the sliding sleeve of FIG. 12.
Figure 14:
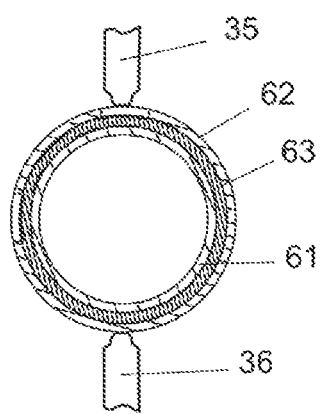
FIG. 14 is a cross-sectional view of the example casing tube of FIGS. 12-13.

FIGS. 11 to 15 show an example of a telescoping casing tube unit 60. The telescoping casing tube unit 60 comprises the upper steering shaft 3, which has been described above in FIG. 1 and FIG. 10. The upper steering shaft 3 is mounted in an inner casing tube 61 and an outer casing tube 62. For the axial displacement of the steering column, the inner shaft piece 71 and the outer shaft piece 72 of the upper steering shaft 3 are displaceable in their longitudinal axis 73, as was explained with the aid of FIG. 10. Moreover, the inner casing tube 61 is displaceable with respect to the outer casing tube 62 in the axial direction, corresponding to the longitudinal direction of the longitudinal axis 73. Between the inner casing tube 61 and the outer casing tube 62 there is provided a sliding sleeve 63, which is shown separately in FIG. 12. The sliding sleeve 63 sits between the inner casing tube 61 and the outer casing tube 62, as can be seen in FIG. 13. The inner casing tube 61 and the outer casing tube 62 are not shafts in the technical sense, since they have a round circular cross section and cannot transmit any torques. Even so, it is advantageous for the above mentioned reasons when the seating of the two casing tube parts in the region of the sliding sleeve 63 is free of play, yet smooth in movement. For this purpose, the method described with FIG. 7 is also used for calibrating the sliding sleeve 63 between the inner casing tube 61 and the outer casing tube 62. This is illustrated in FIG. 14. The sonotrode 35 is placed on the outside of the outer casing tube 62, which is braced against the oppositely placed anvil 36. The sonotrode 35 is then actuated again by a control unit 66 with electrical voltage of a given frequency or frequency variation. The vibrational energy, in turn, results in a heating of the sliding sleeve 63.

Figure 15:
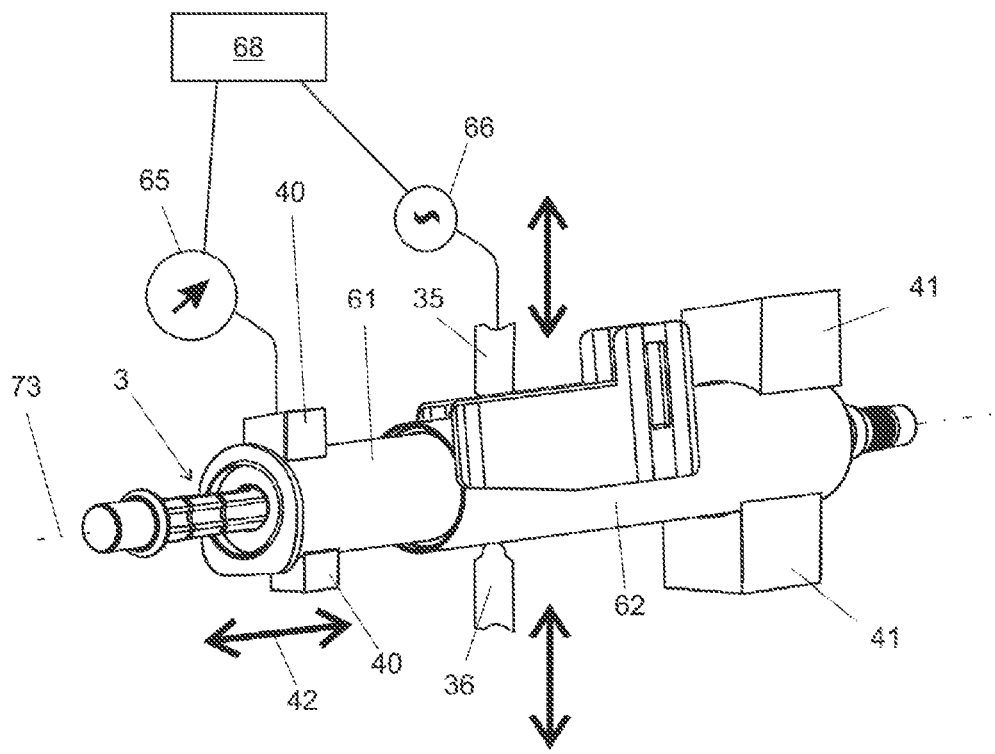
FIG. 15 is a perspective view of the example casing tube of FIGS. 11-14 during calibration of the plastic sleeve.

FIG. 15 illustrates how the inner casing tube 61 is clamped between clamping jaws 40 during the process, while the outer casing tube 62 is clamped between clamping jaws 41. While the sliding sleeve 63 is being heated, the inner casing tube 61 is moved back and forth in the direction of the double arrow 42. The displacement force F required for this is detected with a force sensor 65. The displacement force F decreases with the number of stroke movements in the direction of the double arrow 42. As soon as a given threshold value is reached or passed, the calibrating of the sliding sleeve 63 is terminated. The process control occurs in turn by the control and evaluation unit 68. The casing tube unit 60 thus prepared is then removed from the clamping jaws 40 and 41, the anvil 36 and the sonotrode 35 are removed, and the casing tube can be installed in a bracket 4 according to FIG. 1. As represented in this exemplary embodiment in FIG. 10, the upper steering shaft 3, which is mounted in the telescopic casing tube, likewise comprises a displacement connection, the displacement connection being able to correspond to the exemplary embodiments of FIGS. 2 to 9 and being adapted to transmit torques.

Figure 16:
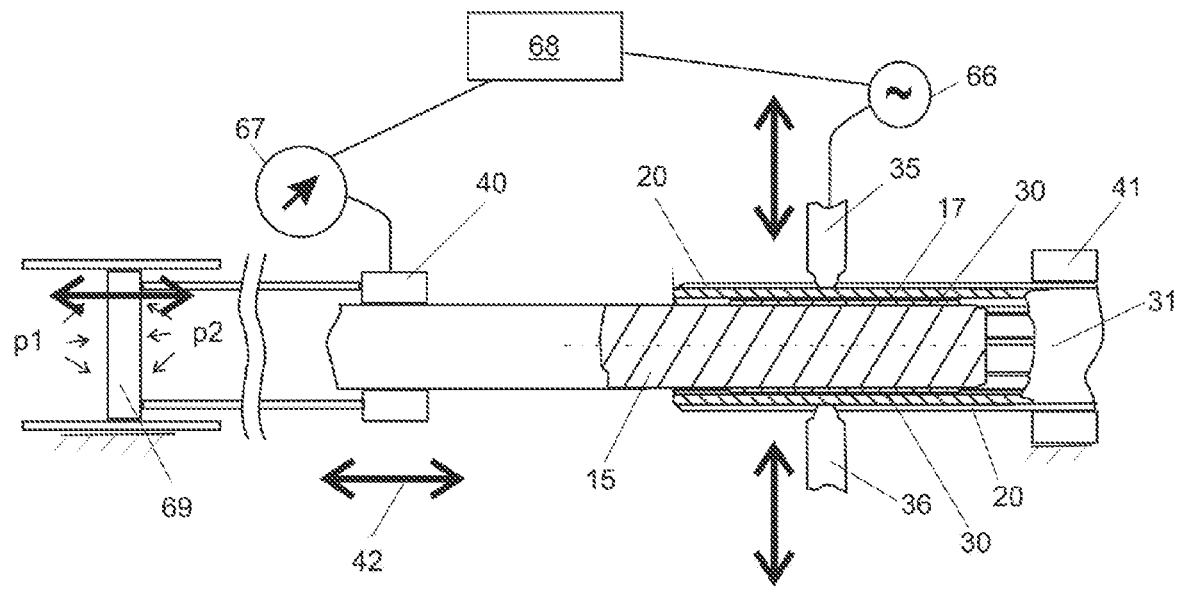
FIG. 16 is a longitudinal sectional view of the example steering shaft of FIGS. 5-6 during calibration of the plastic sleeve.

Alternatively or in combination with the use of a force sensor 65, a speed sensor 67 may be provided, which can also be designed as a displacement sensor, the speed being determined in a control and evaluation device 68. This is illustrated in FIG. 16. FIG. 16 shows the embodiment of FIG. 5 in a longitudinal section, similar to FIG. 7, where once again the sonotrode 35 and the anvil 36 are each placed in a slot 20 of the outer shaft piece 17. The inner shaft piece 15 is installed in the plastic sleeve 30 and the outer shaft piece 17. The two shaft pieces are now grasped by clamping jaws 40 and 41. The clamping jaw 41 is held stationary, while the clamping jaw 40 can be subjected to movement by a pneumatic cylinder. A control and evaluation unit 68 undertakes the process control. The sonotrode 35 is actuated by a control unit 66 in order to transmit an ultrasound vibration to the outer shaft piece 17. In this way, the outer shaft piece 17 is placed in a mechanical vibration. Since the outer shaft piece 17 itself vibrates relatively freely, the vibrational energy is transmitted in large measure to the plastic sleeve 30, which is thereby deformed with high frequency. The plastic sleeve 30 becomes heated in this process. At the same time, the inner shaft piece 15 is moved back and forth in the axial direction by a relative movement in the direction of the double arrow 42 by means of the clamping jaws 40 and 41. For this, the pressures p1 and p2 are alternately increased and decreased, so that the piston 69 is moved back and forth. The piston 69 is accordingly coupled mechanically to the clamping jaw 40. The heated plastic sleeve 30 becomes adapted to the two mutually facing surfaces of the inner shaft piece 15 and the outer shaft piece 17. The adapting process can be monitored by detecting the speed with which the clamping jaw 40 is moved by means of a distance sensor or a speed sensor 67. Preferably, the heating of the plastic sleeve 30 by means of ultrasound and the movement in the direction of the double arrow 42 is continued until such time as the maximum value of the displacement velocity exceeds a given minimum target value. The adapting process is then finished. This process sequence likewise offers the already mentioned benefits.

The sequence of the above described processes thus provides the following partly optional process steps as an exemplary embodiment:
providing the two shaft pieces to be joined, wherein
either at least one of the two shaft pieces has a plastic coating on the surface facing toward the other shaft piece,
or a plastic sleeve is provided abutting between the shaft pieces,
joining the shaft pieces, optionally with the plastic sleeve in between,
wherein the shaft pieces and optionally the plastic sleeve are configured such that the joining can occur only by overcoming a pressing force, since the sliding fit is designed with an oversize,
clamping the unit in a device in which the two shaft pieces can be clamped and subjected to a displacement force in the axial direction. The device is preferably outfitted such that a displacement force can be measured.
pressing a sonotrode from one side against the respectively outer shaft pieces and bracing the inner piece against a counter-holder (anvil),
injecting an ultrasound signal into the sonotrode and moving the shaft pieces back and forth in the axial direction until the displacement force reaches a desired target value. Alternatively, the method can be carried out such that the shaft pieces are moved relative to each other with a constant force and the displacement velocity is measured. The process is then ended when a particular displacement velocity is achieved.
after the end of the process, the shaft is removed from the device as a finished component and is installed elsewhere.

What is claimed is:
1. A method for producing an axially movable connection between two components, between which two components a plastic is disposed as a sliding material, the method comprising:
providing the two components to be joined, wherein a plastic sleeve is disposed between the two components, and the two components, and the plastic sleeve are situated free of play with respect to each other;
joining the two components to form a unit by way of a pressing force in an axial direction;
clamping the unit in a device in which the two components are clampable and subjectable to a displacement force in the axial direction;

pressing a sonotrode from one side against an outer of the two components and bracing the outer of the two components against a counter-holder;

injecting an ultrasound signal into the sonotrode and moving the two components back and forth in the axial direction until a displacement force or a displacement velocity reaches a target value; and ending the ultrasound signal and removing the unit from the device.

2. The method of claim 1 wherein a frequency of the ultrasound signal is in a range of 20 to 35 kHz.

3. The method of claim 1 comprising varying a frequency of the ultrasound signal while injecting the ultrasound signal into the sonotrode.

4. The method of claim 1 wherein the two components comprise an inner shaft piece and an outer shaft piece.

5. The method of claim 1 wherein the two components comprise an inner shaft piece and an outer shaft piece of a motor vehicle steering system.

6. The method of claim 1 wherein the two components comprise an inner casing tube and an outer casing tube of an axially telescopic motor vehicle steering system.

7. The method of claim 1 wherein the sonotrode is a first sonotrode, the method comprising pressing the first sonotrode and a second sonotrode against the outer of the two components.

8. The method of claim 7 comprising injecting the first and second sonotrodes with ultrasound signals of different frequencies.

9. A motor vehicle steering system comprising a telescopic steering shaft and/or a telescopic casing tube unit that is produced according to the method of claim 1.

* * * * *